United States Patent [19]

Lundell

[11] Patent Number: 4,951,762
[45] Date of Patent: Aug. 28, 1990

[54] DRILL BIT WITH CEMENTED CARBIDE INSERTS

[75] Inventor: Lars-Gunnar Lundell, Sandviken, Sweden

[73] Assignee: Sandvik AB, Sandviken, Sweden

[21] Appl. No.: 386,424

[22] Filed: Jul. 28, 1989

[30] Foreign Application Priority Data

Jul. 28, 1988 [SE] Sweden .................................. 8802749

[51] Int. Cl.⁵ ............................................. E21B 10/52
[52] U.S. Cl. ..................................... 175/410; 76/108.2
[58] Field of Search ........................ 175/410; 76/108 A

[56] References Cited

U.S. PATENT DOCUMENTS

| | | | |
|---|---|---|---|
| 3,294,186 | 12/1986 | Buell . | |
| 3,528,465 | 9/1970 | Omley . | |
| 4,683,781 | 8/1987 | Kar et al. | 76/108 A |
| 4,694,918 | 9/1987 | Hall | 175/329 |
| 4,764,255 | 8/1988 | Fischer et al. | 175/410 X |
| 4,817,742 | 4/1989 | Whysong | 175/410 |
| 4,821,819 | 4/1989 | Whysong | 175/410 |

FOREIGN PATENT DOCUMENTS 205264  6/1966  Sweden .

*Primary Examiner*—William P. Neuder
*Attorney, Agent, or Firm*—Burns, Doane, Swecker & Mathis

[57] ABSTRACT

A drill bit of the percussion type includes a bit body of steel, a front portion of which is provided with at least one slot in which an insert is attached by brazing. Brazed between the insert and side walls of the slot are side plates which are of uniform thickness while being thinner than the insert. The side plates are formed of cemented carbide or a metal alloy with a coefficient of linear expansion which for temperatures below 500° C. is substantially smaller than that of steel and the braze metal while being approximately the same as that of the insert.

14 Claims, 1 Drawing Sheet

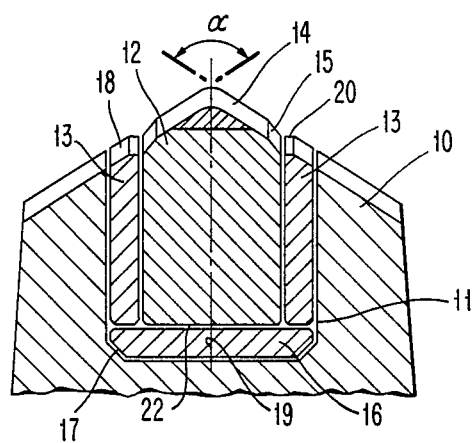
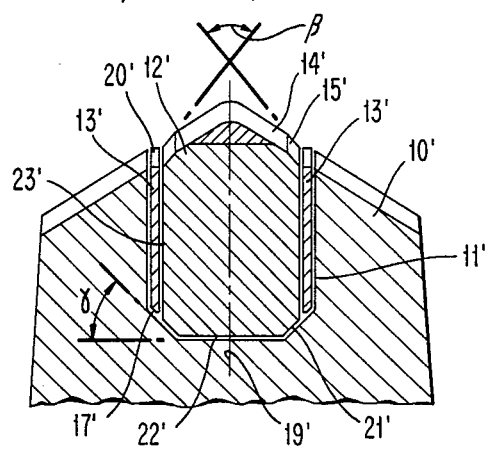
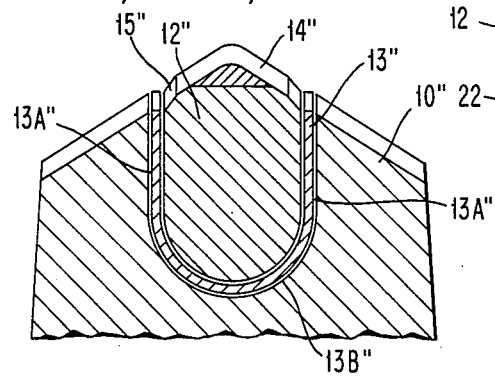
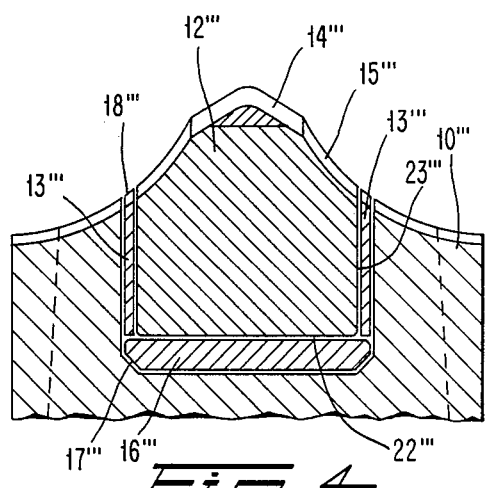
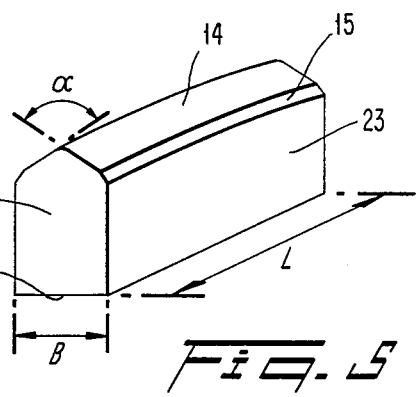

DRILL BIT WITH CEMENTED CARBIDE INSERTS

BACKGROUND OF THE INVENTION

The present invention relates to a drill bit preferably a bit of the percussion type having a bit body of steel, the front of which is provided with one or several slots in which inserts of tough hard metal are attached by brazing.

With commonly available drill bits equipped with hard metal inserts, stresses occur between the hard metal insert and the steel material during brazing which under percussion impact are released and can lead to premature failure. The primary reason therefor is the difference in coefficients for linear expansion between the hard metal and the steel. It has been found that in rock formations that cause severe wear of the drill bit it is desirable to use cemented carbide grades of greater hardness which hitherto has been impossible due to the fact that they become too brittle due to the above-related braze stresses. The use of inserts of cemented carbide grades of higher hardness would also enable a reduction of the number of regrinding operations. Especially in long hole drilling operations it is desirable to drill as far as possible without having to interrupt the work for removing the drill for regrinding purposes.

OBJECTS AND SUMMARY OF THE INVENTION

It is a purpose of the invention to solve the above-related problems. In accordance with the present invention, a new and improved drill bit primarily suitable for percussive drilling and also for rotary and crush drilling. Slots are formed in the drill bit which receive cemented carbide inserts. Brazed between each insert and the side walls of its slot are support plates. The support plates have a substantially smaller thickness than the inserts, and are made of cemented carbide or a metal alloy having a coefficient of linear expansion that is less than that of the steel and the brazing alloy while being almost the same as that of the cemented carbide inserts. Due to such an arrangement, there is achieved a more rapid self-sharpening type of wear of the beveled faces of the insert, i.e., fewer regrinding operations are needed while simultaneously achieving improved life time in rock formations that cause severe wear. In accordance with a preferred embodiment of the invention, the insert is in the shape of a chisel and exhibits at normal noise point angles 95-125 degrees a width to length ratio that is at least 0.18, preferably 0.25.

The insert should comprise cemented carbide, i.e., a sintered material comprising one or several carbides such as tungsten carbide, WC, and/or other hard substances, and a binder metal, usually cobalt. The composition of the cemented carbide preferably includes 4-8% cobalt and the remainder WC with a grain size in the area 1-6 $\mu$m.

BRIEF DESCRIPTION OF THE DRAWING

The objects and advantages of the invention will become apparent from the following detailed description of preferred embodiments thereof in connection with the accompanying drawings, in which like numerals designate like elements, and in which:

FIG. 1 is an axial sectional view through a slot of a drill bit depicting therein a cutting insert and supporting plates according to the invention;

FIG. 2 is a similar view of a second embodiment of the invention;

FIG. 3 is a similar view of a third embodiment of the invention;

FIG. 4 is a similar view of a fourth embodiment of the invention; and

FIG. 5 is a schematic perspective view of a chisel-type insert according to FIG. 1.

DETAILED DESCRIPTION OF PREFERRED EMBODIMENTS OF THE INVENTION

Referring to FIG. 1, the drill bit comprises a bit body 10 of steel, the front working end of which is provided with a plurality of slots, of which only a central slot 11 is depicted. The central slot 11 has a straight rear wall in which a cemented carbide insert 12 (see FIGS. 1 and 5) with a straight base portion is located. The areas between the insert 12 and the side walls of the slot 11 contain side plates of uniform thickness, the plates each having a thickness of 1-4 mm. The side plates 13 comprise cemented carbide of a type tougher than that of the insert 12, preferably comprising 8 to 25 weight percent cobalt and the remainder tungsten carbide, having a linear expansion coefficient that is considerably less than that of steel and substantially the same as that of the insert. The attachment between the side surfaces 23 of the insert 12 and the side plates 13, and between the side plates and the side walls of the slot 11 is achieved by brazing where the braze metal preferably is a bronze or silver alloy, although other braze alloys can be used. For example, the regions between the side surfaces 23 of the insert and the side surfaces of the slot 11 could be filled with braze material, and the side plates 13 immersed therein.

The insert 12 shown is of a chisel-type, i.e., its front end has an inner portion 14 extending from the bit body 10 which portion 14 has a conical nose point angle $\alpha$, which typically lies in the range of 95 to 125 degrees. The outer surface portions 15 of the front end of the insert located adjacent the support plate 13 form a nose point angle $\beta$, which is less than $\alpha$, preferably in the range of 70 to 80 degrees. Each of the support plates 13 located between the insert 12 and the side walls of the slot 11 has a uniform thickness that is essentially smaller than that of the insert 12.

In the embodiment shown in FIG. 1, there is additionally provided a bottom plate 16 having the same thickness as the side plates 13, whereby the bottom plate is provided as a support plate between the base portion of the insert and the bottom wall of the slot 11. At each of its lateral rear end portions the bottom plate 16 is provided with a beveled surface 17, and the transition zone between the bottom wall and an adjacent side wall of the slot has the same beveled shape. The outer portion of the front end of each of the support plates 13 is provided with a beveled face 18 inclined at an angle $\alpha/2$ relative to the central axis 19 whereas the inner portion 20 of the front end of each support plate 13 located immediately adjacent the insert is oriented perpendicularly in relation to the central axis 19.

By forming the side plates 13 of a cemented carbide containing cobalt, especially with a higher cobalt percentage than the insert, the tendency for the brazed side portions 23 of the insert to become depleted of cobalt (and thus becoming undesirably more brittle during brazing) is minimized, because the transfer of cobalt from the surfaces 23 will be offset by the transfer of cobalt to those surfaces from the side plates 13. Furthermore, by employing cemented carbide side plates with a higher cobalt percentage than the insert, the side plates are able to "give up" cobalt while retaining a sufficient amount of cobalt to remain tough (not brittle).

In the embodiment shown in FIG. 2, the rear end surface 17' of each of the support plates 13' is beveled at an angle γ, that preferably amounts to 40-50 degrees and is the same as the inclination angle of an opposing surface 21' of the insert which provides a transition between the insert rear and side surfaces 22' and 23'. The surface portion 20' of the side plates 13' is in this case oriented perpendicularly in relation to the central axis 19', i.e., planar and parallel with the rear surface 22' of the insert. The floor portion of the slot 11' has been given a shape corresponding to that of the surfaces 17', 21' and 22'. In this embodiment of FIG. 2 the side plates 13' can be made of a commercially available Fe-Ni-alloy type INVAR, the coefficient of linear expansion of which in the area below 500° C. is considerably less than that of the steel and the braze alloy. Alternatively, other similar metal alloys can be used such as a Fe-Ni-Co-alloy, which would provide the advantage of giving up cobalt and minimizing the formation of cobalt depleted zones as described earlier.

In the embodiment shown in FIG. 3, the base portion of the insert 12" has a semi-cylindrical form and the side surface as well as the rear portion of the insert are defined by a one-piece continuous support plate 13" having uniform thickness. The support plate is of U-shaped cross-section having linear, parallel legs 13A" interconnected by a semi-cylindrical portion 13B".

In the embodiment shown in FIG. 4, the base portion of the insert 12''' and the bottom supporting plate 16''' have been given the same shape as the embodiment shown in FIG. 1. In contrast with FIG. 1 the side plates 13''', however, have been given an essentially smaller thickness than that of the bottom supporting plate 16'''. The rear end surfaces of the side supporting plates 13''' are planar and parallel to the rear surface 22''' of the insert and similarly intended to supportingly abut against the support plate 16''' whereas the front end surface 18''' is beveled. In the embodiment shown in FIG. 4, the outer surface portions 15''' of the front end of the insert located adjacent the side surfaces 23''' are smoothly rounded in concave shape. The part of the outer surface portion 15''' that is located immediately adjacent the side supporting plate 13''' is inclined at an angle that substantially corresponds with that of the front end surface 18''' of the support plate 13'''. This enables a reduced risk of having the braze joint and the cobalt depleted zone of the insert subjected to percussive impact against the rock. This form of the insert 12''' also enables improved conditions for removal of drill cuttings. In the embodiment shown in FIG. 4, the bottom support plate 16''' is made of tougher hard metal than that of the insert 12''', preferably of a cemented carbide material comprising 8 to 25 weight percent cobalt and the remainder tungsten carbide, whereas the side support plates 13''' are made of a metal alloy having a coefficient of linear expansion that is considerably lower than that of the steel and the braze material. The side plate 13''' has a thickness less than 1 mm whereas the thickness of the bottom plate 16''' preferably is from 1 to 4 mm.

In connection with all of the preferred embodiments, it is very important to select the insert material which preferably should be a cemented carbide with a cobalt content of 4-8 percent and the remainder being tungsten carbide and having a grain of preferably 1 to 6 μm. The dimensioning of the insert is also of vital importance. The general rule should be that the width B of the insert is not less than 0.18 times the length L of the insert. The nose point α angle should be in the range of 95 to 125 degrees. The width/length ratio therefore ought to be $B/L \geq 0.18$, preferably $B/L \geq 0.25$. The primary purpose thereof is to ensure that the insert and specifically any cobalt depleted portion is not brought into direct contact with the rock during the drilling operation.

Furthermore, it is of vital importance to make a proper choice of material in the side plates 13, 13', 13'', 13''' and, as the case may be, also in the bottom supporting plate 16, 16'''. These side and bottom support plates should comprise cemented carbide, or a metal alloy the linear expansion coefficient of which, for temperatures below 500° C., is considerably less than that for steel and the braze metal. By making these side and bottom support plates of uniform thickness their manufacture and the brazing steps are simplified because inserts of uniform thickness can be brazed in the normal way that elements are brazed in slots having planar and parallel side surfaces. Also, this enables the maintenance of the width of the insert during its entire lifetime whereby a direct contact between the rock and the braze joint and contact of a cobalt depleted zone with the material being cut can essentially be avoided. The thickness of the cemented carbide plates should be 1 to 4 mm and those carbide grades that are suitable for the support plates 13, 16 ought to comprise a cobalt content in the range of 8 to 25 weight percent and the remainder being tungsten carbide WC. Support plates 13 made of a metal alloy such as INVAR should preferably have a thickness less than 1 mm.

EXAMPLE:

A drill bit is made of a bit body of steel with a diameter 33 mm equipped with a chisel-type cemented carbide insert, the carbide comprising 6 percent cobalt and the remainder WC. The nose point angle α was 110 degrees and the width was 10 mm. The width of the insert is normally larger than 7 mm and preferably larger than 0.5 mm. If the drill bit is to be equipped with rotary symmetrical inserts (buttons) the same basic rule shall apply as related earlier, i.e., the insert shall be designed such that the braze material and the cobalt depleted zone in the insert is not subjected for direct percussive impacts from the rock.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A drill bit comprising:
    a steel bit body having a front surface containing at least one slot;
    an insert formed of cemented carbide having side surfaces disposed in said slot, and a front end projecting from said slot; and
    support plate means disposed in said slot and including first side surface means brazed by a braze metal to said side surfaces of said cemented carbide insert and second side surface means brazed to opposing steel side walls of said slot, said support plate means being of substantially uniform thickness, said thickness being substantially smaller than that of said cemented carbide insert, said support plate means formed of cemented carbide or a metal alloy having a coefficient of linear expansion which for temperatures below 500° C. is substantially smaller than that for steel and the braze metal while being approximately the same as that of said cemented carbide insert.

2. A drill bit according to claim 1, wherein said front end of said insert forms a nose point angle of from 95 to 125 degrees.

3. A drill bit according to claim 1, wherein the ratio of width to length of said insert is at least 0.18.

4. A drill bit according to claim 3, wherein said ratio is at least 0.25.

5. A drill bit according to claim 1, wherein said side surfaces of said insert are substantially parallel to each other and are interconnected at their rear ends by a semi-cylindrical rear surface of said insert, said side plate means comprising a one-piece element shaped complementarily to said side and rear surfaces of said insert.

6. A drill bit according to claim 1, wherein said side plate means comprises two side plates having beveled rear ends, said insert having a rear end which includes bevels located adjacently to and aligned with respective beveled rear ends of said side plates, said slot including a rear wall shaped complementarily to said rear ends of said insert and side plates.

7. A drill bit according to claim 1, wherein said support plate means comprises two side plates having rear ends, said insert having a rear end, said rear ends of said insert and said side plates oriented perpendicular to a center axis of said slot, a bottom plate disposed between a rear wall of said slot and said rear ends of said side plates and said insert, said bottom plate formed of the same material as said side plates, said rear wall of said slot being interconnected with said side walls of said slot by beveled transition walls, said bottom plate having a rear surface which is beveled complementarily to said rear wall.

8. A drill bit according to claim 7, wherein said side plates are made of a metal alloy chosen from the group consisting of Fe-Ni and Fe-Ni-Co, said insert formed of cemented carbide with a 4 to 8 weight percent Co and the remainder tungsten carbide, said bottom plate comprising a cemented carbide with a higher cobalt content than said insert, the remainder of said bottom plate comprising tungsten carbide.

9. A drill bit according to claim 8, wherein said bottom plate has 8 to 25 percent weight Co.

10. A drill bit according to claim 8, wherein said side plates have a thickness less than 1 mm, said bottom plate having a thickness from 1 to 4 mm.

11. A drill bit according to claim 1, wherein said front end of said insert includes an inner portion forming a first nose point angle, and outer portions disposed adjacent front ends of said side plates, said outer portions forming a second nose point angle which is smaller than said first nose point angle.

12. A drill bit according to claim 1, wherein each of said side plates include a front surface oriented perpendicular to a center axis of said slot.

13. A drill bit according to claim 1, wherein said front end of said insert includes an inner portion forming a nose pint angle, and two outer portions disposed adjacent front ends of said side plates, said outer portions being of concave shape, said front ends of said side plates forming an acute angle with a center axis of said slot, said outer portions approaching said front ends of said side plates at angles substantially corresponding to said acute angles.

14. A drill bit comprising:
a steel bit body having a front surface containing at least one slot;
an insert formed of cemented carbide having side surfaces disposed in said slot, and a front end projecting from said slot; and
support plate means disposed in said slot and brazed by a braze metal to said side surfaces of said insert and to opposing side walls of said slot, said support plate means being of substantially uniform thickness, said thickness insert, said support plate means formed of cemented carbide having a greater weight percent Co than said insert and having a coefficient of linear expansion which for temperatures below 500° C. is substantially smaller than that for steel and the braze metal while being approximately the same as that of said insert.

* * * * *